United States Patent Office 3,541,183
Patented Nov. 17, 1970

3,541,183
CROSSLINKED POLYURETHANES CONTAINING SEGMENTS FROM HYDROXY TERMINATED 1,6-HEXANEDIOL POLYCARBONATE
Wilhelm Kallert, Cologne-Stammheim, Joszef Ivanyi, Opladen, and Erwin Müller, Leverkusen, Germany, assignors to Farbenfabriken Bayer Aktiengesellschaft, Leverkusen, Germany, a corporation of Germany
No Drawing. Filed Feb. 16, 1968, Ser. No. 705,890
Claims priority, application Germany, Feb. 28, 1967, F 51,555
Int. Cl. C08g 41/04
U.S. Cl. 260—858                                                4 Claims

ABSTRACT OF THE DISCLOSURE

Cross-linked polyurethanes prepared from diisocyanates, polyhydroxy compounds which are mixtures of at least about 70% of 1,6-hexanediol polycarbonate and not more than about 30% of an hydroxyl polyester prepared from at least two glycols and one dicarboxylic acid, and chain lengthening agents containing at least two hydrogen atoms which are reactive with isocyanate groups.

---

This invention relates to cross-linked polyurethanes and, more particularly, to a unique method for the preparation of cross-linked polyurethanes having superior properties.

The production of cross-linked synthetic resins from higher molecular weight, linear hydroxyl polyesters, diisocyanates and low molecular weight chain lengthening agents which contain at least two hydrogen atoms which are reactive with isocyanates is already known. The hydroxyl polyesters used to prepare such products are generally dicarboxylic acid polyesters such as the polyesters of adipic acid, succinic acid, sebacic acid and azelaic acid. In addition, hydroxyl-containing polycarbonates such as 1,6-hexanediol polycarbonates have been suggested as suitable for use as higher molecular weight linear polyhydroxy compounds in the preparation of cross-linked polyurethane resins. It has been found that, depending upon the polyhydroxy compound used, cross-linked polyurethane resins having varying degrees of resistance to hydrolysis will be obtained. In order to obtain the highest degree of resistance to hydrolysis, polycarbonates such as 1,6-hexanediol polycarbonate should be used to prepare the elastomer, while polyurethane elastomers having a low resistance to hydrolysis are those which are prepared from dicarboxylic acid polyesters. It is possible, however, to obtain some subtle differences in resistance to hydrolysis depending on the type of dicarboxylic acid polyesters employed.

It is therefore an object of this invention to provide a cross-linked polyurethane and method for preparing it which is devoid of the foregoing disadvantages.

Another object of this invention is to provide polyurethane elastomers which have a high resistance to hydrolysis as well as improved cold resistance.

Still another object of this invention is to provide polyurethane elastomers which have improved processability over those prepared from pure 1,6-hexanediol polycarbonates.

A further object of this invention is to provide elastomers which have excellent mechanical properties which are stable and do not deteriorate.

The foregoing objects and others which will become apparent from the following description are accomplished in accordance with this invention, generally speaking, by providing a polyurethane elastomer having a high degree of resistance to hydrolysis and improved cold resistance and processability which is prepared by reacting diisocyanates and low molecular weight chain lengthening agents containing at least two hydrogen atoms which are reactive with isocyanate groups with a mixture of at least about 70% of 1,6-hexanediol polycarbonate and not more than about 30% of an hydroxyl polyester prepared from at least two different glycols and at least one dicarboxylic acid.

The polyurethane elastomers prepared in accordance with this invention have a high resistance to hydrolysis due to the polycarbonate moiety while also possessing an improved resistance to cold and improved processability compared with those elastomers obtained from pure 1,6-hexanediol polycarbonates. The improved processability or working up properties of the polymers of this invention are especially important for processing from the liquid phase such as, for example, in the cast process, since the mixture of polyesters and polycarbonates used in the preparation of the polymer have a lower viscosity at the processing temperatures generally employed than pure hexanediol polycarbonate. As a consequence, the melt can be cast more easily without the formation of bubbles. The elastomers of this invention also have excellent mechanical properties which do not deteriorate as do those of elastomers prepared when polyester mixtures are used.

Any suitable hydroxyl-containing polyester synthesized from at least two different glycols and at least one dicarboxylic acid may be used to prepare the elastomers described herein, although those polyesters prepared from ethylene glycol, 1,4-butanediol and adipic acid or from neopentyl glycol, hexanediol-(1,6) and adipic acid are preferred. Some other suitable polyesters which may also be employed include, for example, those prepared from ethylene glycol, propylene glycol and adipic acid, the polyesters of hexanediol, butanediol-(1,4) and adipic acid, the corresponding polyesters of succinic acid, sebacid acid, azelaic acid and the like; those polyesters mentioned in German patent specification 1,193,241 and any of those polyesters as described herein and prepared from the components listed in U.S. Pat. 3,201,372. The preferred molecular weight of the polyester is between about 500 and about 3000. The preferred molecular weight of the hexanediol-1,6-polycarbonate is between about 800 and about 3000. The molar ratio of the different glycols in the polyester should be chosen in such a manner that at least 10 mol-percent are present of each glycol.

The hydroxyl - containing hexanediol - (1,6) polycarbonates and the hydroxyl polyesters may be prepared by any suitable known method such as, by reacting 1,6-hexanediol with a diarylcarbonate such as diphenylcarbonate, ditolylcarbonate or dinaphthylcarbonate, either by heating the reactants alone or with the use of ester interchange catalysts. Preferably, diphenylcarbonate is used. Polycarbonates of different higher molecular weights are obtained depending on the proportions of 1,6-hexanediol and diarylcarbonate used, always with removal of the calculated quantity of phenol by distillation. Polycarbonates of molecular weights from 800 to 3000 are preferred in the process according to the present invention. The hexanediol polycarbonate obtained is a pale wax which has a softening range of 38 to 52° C., depending on its molecular weight.

Any suitable organic diisocyanates may be used to prepare the elastomers of this invention including, for example, 1,5-naphthylene diisocyanate, diphenylmethane-4,4'-diisocyanate, m- and p-phenylenediisocyanate, 2,4- and 2,6-tolylene diisocyanate and mixtures of these isomers, diphenylether-4,4'-diisocyanate, diphenylsulphone-4,4'-diisocyanate, diphenylcarbonate-4,4'-diisocyanate as well as any of those mentioned in Canadian Pat. 698,636 and mixtures thereof and the like.

The chain lengthening agents used are preferably glycols such as 1,4-butanediol, 1,6-hexanediol, 2,3-butanediol, p-phenylene-di-b-hydroxyethyl ether, p-xylylene glycol, 1,5-naphthalene-di-b-hydroxyethylether and the like. Unsaturated glycols may also be employed to facilitate subsequent cross-linking with sulphur, including, for example, glycerol monoallylether, dimethyloldihydropyran, 1,4 - butane - bis - N,N' - allyl - N,N'-b-hydroxyethylurethane and the like. Any suitable chain lengthening agent for subsequent crosslinking with formaldehyde may also be used including, for example, m-dihydroxyethyl-toluidine and the like. Other chain lengthening agents may also be used including, 3,3'-dichloro-4,4'-diamino-diphenylmethane, diethyltolylenediamine, m-xylylene diamine, water, any of those listed in U.S. Pat. 3,201,372 or mixtures thereof and the like.

The elastomeric polyurethanes of this invention may be prepared by any suitable method. For example, one method which may be employed is based on the casting process in which the mixture of linear hydroxyl polyesters and polycarbonates is reacted with an excess of diisocyanate and, after the addition of chain lengthening agent in less than a stoichiometric quantity, the reaction product is poured into molds and heated.

Another procedure which may also be used involves mixing together the mixture of hydroxyl polyesters and polycarbonates and the chain lengthening agent, reacting the admixture with an excess of diisocyanate, and thermoplastically shaping the reaction product with heat and pressure after it has been granulated.

To obtain processable synthetic resins which are only converted into the cross-linked state in a second step, the mixture of hydroxyl polyesters and polycarbonates may be mixed with a chain lengthening agent and then reacted with less than an equivalent amount of diisocyanate. Rollable products which are stable on storage are thus obtained which may be converted subsequently into the cross-linked state by the incorporation therein of additional quantities of diisocyanate. The stable, rollable products may be cross-linked with peroxides if suitable diisocyanates such as diphenylmethane-4,4'-diisocyanate, for example, are used, or with sulphur or formaldehyde if suitable unsaturated chain lengthening agents are used.

The products of the instant process can be used in the construction of machinery, to prepare gear wheels, drive chains or seals, in the construction of vehicles, as shoe sole materials and coatings.

The invention is further illustrated but is not intended to be limited by the following examples in which all parts and percentages are by weight unless otherwise specified.

EXAMPLE FOR COMPARISON

About 1000 parts of an anhydrous hexanediol-(1,6) polycarbonate having an OH number of about 54 and prepared by the process described in copending application Ser. No. 671,198, filed on Sept. 28, 1967 by the same applicants, are stirred together with about 180 parts of 1,5-naphthylene diisocyanate at about 130° C. After about 12 minutes under vacuum, a clear melt is obtained. About 20 parts of 1,4-butanediol are then mixed into the melt. About 1 minute is available for casting the resulting product into molded articles. The inclusion of air bubbles is unavoidable if the parts to be formed are of a complicated shape and the melt has a high viscosity. After a further about 24 hours at about 110° C., an elastomer is obtained which has the physical properties listed in Table I.

EXAMPLE 1

About 900 parts of the polycarbonate described in the comparative Example are worked up into an elastomer by the method described in that Example after they have been mixed with about 100 parts of a polyester prepared by the thermal esterification of adipic acid and an equimolar mixture of ethylene glycol and 1,4-butanediol. The melt, which is ready for casting, can be worked up quite satisfactorily into complicated shapes without the inclusion of air, and has a pot life of about 3 minutes. The physical properties of the finished product are listed in Table I under 1.

EXAMPLE 2

An elastomer prepared in the same way as in Example 1 but from a mixture of about 700 parts of the polycarbonate and about 300 parts of the mixed ester yields elastomeric products which have the properties listed under 2 in Table I. The mixture has a pot life of about 3½ minutes and is of a very advantageous consistency for casting.

EXAMPLE 3

An elastomer obtained as described in Example 1 from about 800 parts of the described polycarbonate and about 200 parts of a mixed ester of adipic acid with about 70 parts by weight of 1,6-hexanediol and about 30 parts by weight of 2,2'-dimethyl-1,3-propanediol had a casting time of about 3 minutes and could be molded into parts having complicated shapes. The physical properties of the product are listed under 3 in Table I.

TABLE 1

|  | Comparison example | 1 | 2 | 3 |
|---|---|---|---|---|
| Tensile strength kg./cm.² according to DIN 53 504 | 234 | 240 | 230 | 250 |
| Elongation at break percent according to DIN 53504 | 420 | 440 | 450 | 480 |
| Impact elasticity percent according to DIN 53512 | 53 | 52 | 51 | 49 |
| Abrasion loss mm.³ according to DIN 53516 | 21 | 22 | 24 | 22 |
| Damping maximum | −17 | −28 | −32 | −3 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of polyurethane elastomers which comprises reacting an organic polyisocyanate with a chain lengthening agent containing at least two hydrogen atoms which are reactive with NCO groups and a mixture of at least about 70% of an hydroxylterminated 1,6-hexanediol polycarbonate having a molecular weight of 800 to about 3000 and not more than about 30% of an hydroxyl terminated polyester having a molecular weight of about 500 to about 5000 prepared from at least 10 mol percent of each of at least two different glycols and at least one dicarboxylic acid.

2. The process of claim 1 wherein the hydroxyl polyester is prepared from ethylene glycol, 1,4-butanediol and adipic acid.

3. The process of claim 1 wherein the hydroxyl polyester is prepared from neopentyl glycol, 1,6-hexanediol and adipic acid.

4. The product of the process of claim 1.

References Cited

UNITED STATES PATENTS

| 2,789,968 | 4/1957 | Reynolds | 260—858 |
| 2,999,844 | 9/1961 | Muller | 260—858 |
| 3,444,266 | 4/1969 | Reischl | 260—859 |
| 3,450,793 | 6/1969 | Schnell | 260—858 |
| 3,458,475 | 7/1969 | Krimm | 260—858 |

PAUL LIEBERMAN, Primary Examiner

P. LIEBERMAN, Assistant Examiner

U.S. Cl. X.R.

260—75, 77.5